United States Patent [19]

Fasen et al.

[11] Patent Number: 4,700,244
[45] Date of Patent: Oct. 13, 1987

[54] PROCESS AND SYSTEM FOR COMPENSATING FOR INFORMATION SHIFTS ON DISC STORAGE MEDIA

[75] Inventors: Donald J. Fasen; Roger V. Wilcox, both of Boise, Id.

[73] Assignee: Hewlett-Packard Company, Palo Alto, Calif.

[21] Appl. No.: 829,689

[22] Filed: Feb. 14, 1986

[51] Int. Cl.⁴ .......................... G11B 5/55; G11B 5/56
[52] U.S. Cl. ........................................ 360/77; 360/78
[58] Field of Search ................................... 360/77, 78

[56] References Cited

U.S. PATENT DOCUMENTS

| | | | |
|---|---|---|---|
| 3,994,016 | 11/1976 | Moghadam | 360/77 |
| 4,115,823 | 9/1978 | Commander et al. | 360/77 |
| 4,377,827 | 3/1983 | Rose | 360/78 |
| 4,536,809 | 8/1985 | Sidman | 360/77 |
| 4,556,921 | 12/1985 | Rose | 360/77 |

*Primary Examiner*—George G. Stellar
*Attorney, Agent, or Firm*—William J. Bethurum

[57] ABSTRACT

An improved system and process is provided in a disc drive for determining and for compensating head/track offsets when a data (target) head is moved to a new data (target) track position. Such disc drives typically include an armstack with transducer heads thereon, either pivotally or linearly mounted to move the transducer heads radially across a plurality of memory discs in a disc stack. A dedicated reference head is provided for scanning dedicated servo tracks on a dedicated memory disc, and a data head is provided on each data disc.

Head/track position offset is determined by generating an initial position offset signal indicative of the position offset between the dedicated head and an adjacent dedicated track while a selected data head, called the present head, is centered on its data track.

Head/track position offset is compensated using this initial position offset signal in conjunction with a command signal including a track count to a dedicated target track, to generate a velocity profile and servo current commands used to achieve movement of the dedicated head to a position from which it may be track centered at the target track position. Thereafter any offset between the target head and its target track is used to center the target head on its target track.

11 Claims, 8 Drawing Figures

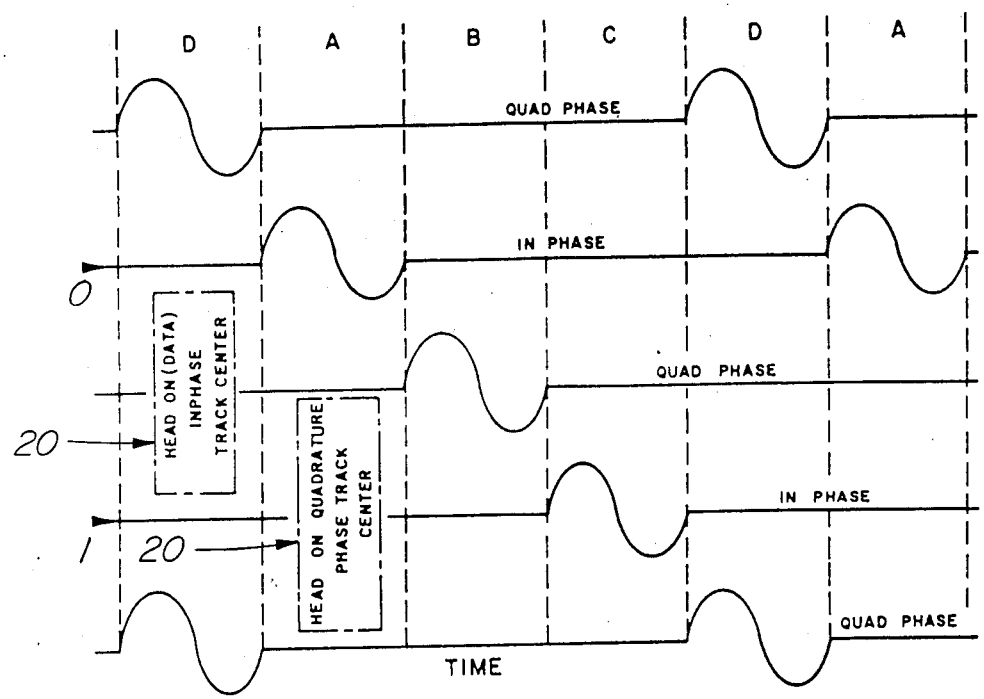
Fig. 2
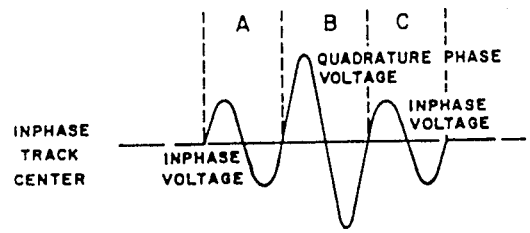
Fig. 2A
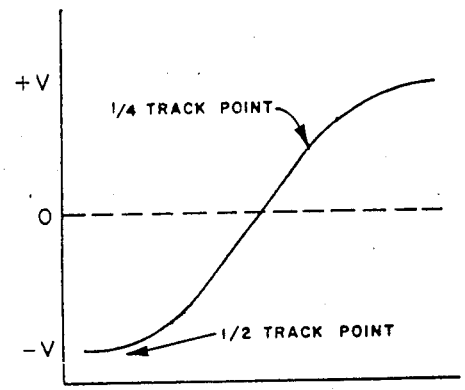
Fig. 3
Fig. 5

PROCESS AND SYSTEM FOR COMPENSATING FOR INFORMATION SHIFTS ON DISC STORAGE MEDIA

TECHNICAL FIELD

This invention relates generally to disc drives of the type including an actuator arm or carriage and a head/arm stack assembly positioned to scan a stack of hard, information storage or memory discs. This type of apparatus is disclosed and claimed in a related copending application Ser. No. 788,282 of Roger L. Sleger entitled "Apparatus and Method for Damping Head Positioners for Disk Drives" filed Oct. 16, 1985, assigned to the present assignee.

More particularly, this invention is directed to an electrical system and process for positioning and centering a target head over a selected data track on a storage disc in a "head seek" operation in such disc drives and compensating for either undesirable radial shifts in information encoded on disc tracks or head position shifts, or both.

BACKGROUND ART

Head positioning systems for controlling the position of data heads in disc drives are generally known in the prior art and are described, for example, in the *Hewlett Packard Journal,* Vol. 35, No. 1, January 1984, incorporated herein by reference. These systems operate on servo code encoded on concentric tracks of magnetic discs. This code is used in both track centering of the heads and head movement across the tracks to a selected track to be read on a selected disc (seek) during disc drive operation. Such a servo system is also disclosed, for example, in U.S. Pat. No. 4,115,823.

Information which is encoded on tracks of a storage medium, such as a magnetic disc, is often shifted radially thereon as a result of exposure to environmental factors such as aging, temperature cycling, shock, and the like. This problem of information shift (relative shift) can also be caused by tilt of the disc spin axis or by tilt of the rotary axis of an arm stack relative to the planes of the disc surfaces of a stack of discs. In both cases there is relative movement between the transducer heads and the recording tracks on the separate discs.

As a result of this shift in encoded information with respect to a head position and the fact that the corresponding servo code on a dedicated track of the disc is by definition the reference code and thus is not seen as being shifted, an initial dedicated head, track center offset error, if uncompensated, may result in a track count error at the end of a track seeking movement of the dedicated transducer head. More specifically, since the seek servo processor uses dedicated head position offset information from the dedicated track surface, precise information as to the location of the dedicated head from a given track center in magnitude and direction is needed to develop an unambiguous, servo driving voltage and to unambiguously indicate whether or not the first track crossing is a valid count in seeking a designated target track.

Various approaches have been taken previously in dealing with such problems. Some of these, as indicated by U.S. Pat. No. 4,115,823 have addressed this problem. U.S. Pat. No. 4,115,823, using normal and quadrature phase voltages derived from voltages from a servo head, uses the quadrature position error signal to extend the linear region of the normal error signal beyond the $\pm \frac{1}{4}$ track range. The present invention provides further improvement extending track offset resolution into the fourth quarter, or to nearly a full track.

DISCLOSURE OF INVENTION

The general purpose of this invention is to provide an improved process and means for compensating for position information shifts in disc drives or files, within a limit of one track spacing or offset. To accomplish this purpose, there is provided herein a novel process and system for compensating for these shifts in encoded information during a head seeking operation to achieve track centered operation, while simultaneously improving track/head position (seek) resolutions by extending resolution to nearly a full track on each side of track center. This information is needed to accurately move a selected data head to a selected data track. To change from a track following mode, i.e., from reading or writing with one data head (the "present" head) on one data surface, and moving to a different data head on a different data track on a different data surface (the "target" head and the target track), the dedicated track offset information is used to correct the track count from the present data track to the target track if the present data track lies between the dedicated head and the target track. In this process the present head is assumed to be track centered.

The positional offset between the present head and the dedicated head is sensed at the dedicated head. This track offset is resolved unambiguously up to a full track on each side of a track center by applying unique logical interpretations to time varying, inphase and quadrature phase signals produced by the dedicated head. The track offset error thus determined indicates which side of track center the dedicated head is on and its magnitude in increments of one-quarter of the distance between track centers.

This positive or negative track offset signal is applied to a servo processor. The dedicated track center from which the offset error is determined is the reference or zero count from which the count to a new track position is initiated and should not be counted. Thus if movement of the dedicated head from the offset position to a new or target track position, identified by a track count (target address), is initiated in a direction crossing that reference track, provision is made either to ignore the first count or to add a count to the desired track count. The dedicated track count to a new or target track position from the present track location of the dedicated head, is used to develop a servo current command for control of movement to the new position. Track crossings are sensed by the dedicated head and the count of track crossings is used to determine when the commanded track count is reached. This is the dedicated target track position. After track centering of the dedicated head at the dedicated target track, reference is made to the track position offset of the target head. A directional signal developed from this offset is coupled to a servo position loop. The target head is now driven to its final track centered position.

In further explanation of the logical interpretation of the inphase and quadrature phase signals of a preferred embodiment of the invention, four (4) phases of servo code are recorded on the dedicated disc. An inphase servo code is recorded on concentric tracks and a quadrature phase servo code is recorded centrally between each track. The four phases are recorded alternatively in a repeating pattern in circumferentially spaced, non overlapping positions, on and between the tracks. Using this code pattern or spacing, the inphase and quadrature phase signals which are developed provide information indicating the amount and the direction of dedicated head offset for the instant dedicated head position relative to a dedicated track center. The inphase signal alone does not provide an unambiguous indication of head position appreciably beyond a quarter track spacing from track center. Applying the logical approach of this invention, ambiguities are removed in track offset distances approaching a full track spacing on each side of a dedicated track center, by simultaneously or sequentially noting the sign and magnitude of the inphase and the quadrature phase signals developed by the dedicated head in a particular track offset location. The data tracks on the other discs include servo code recordings in substantially half track spacings, in segments, on each side of a data track center. These are differentially used to indicate data track centers for track centering after seek and for track following.

The above advantages and novel features of this invention will be better understood in the following description of the accompanying drawings.

BRIEF DESCRIPTION OF DRAWINGS

FIG. 2 shows typical flux reversals of a four phase servo code employed in practicing this invention.

FIG. 2a depicts the induced voltage in the head 20 when it is over the inphase track center and there is relative movement through phases A, B and C as seen in FIG. 2.

FIG. 3 shows a characteristic output voltage as a function of head offset on each side of a track center in FIG. 1, resulting only from either the inphase or the quadrature phase servo codes.

FIG. 5 illustrates the logical interpretations of the signed, bilevel magnitudes of the inphase and quadrature phase voltages on opposite sides of a single dedicated track as seen in FIG. 4;

BEST MODE FOR CARRYING OUT THE INVENTION

Figure 1:
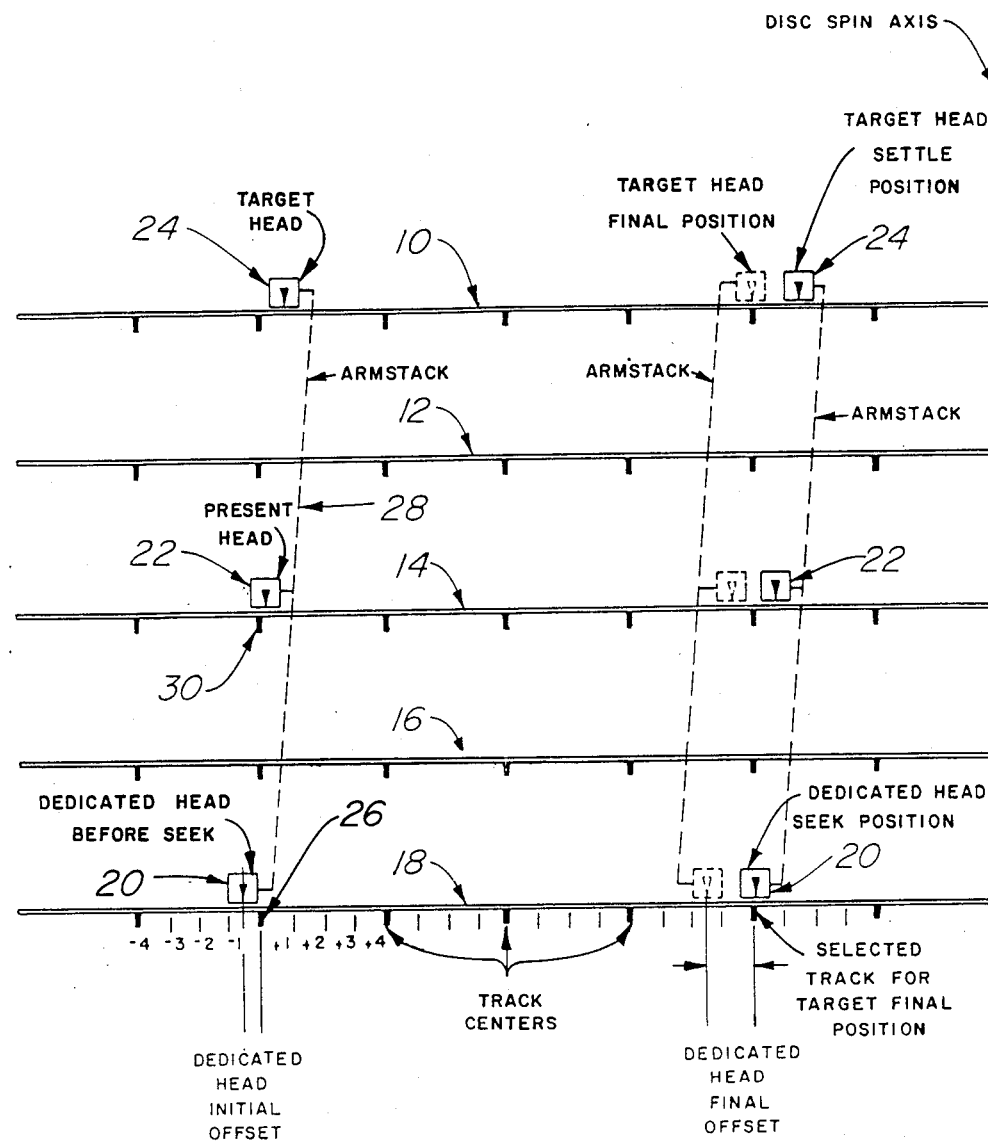
FIG. 1 is a schematic illustration of the dedicated, present and target heads on a tilted arm stack associated with the stacked memory discs. These heads are shown in their pre-seek, post-seek and target positions.

Referring now to FIG. 1, there is shown schematically a fragmentary portion of a disc drive, which may be a magnetic disc drive, comprising, a plurality of memory discs 10, 12, 14, 16 and 18 which are stacked axially of a disc spin axis in a parallel plane array. Memory disc 10 is the dedicated disc and the other memory discs are data discs. Head 20 is the dedicated head. Data head 22 is the present operating head and data head 24 is the target head. The present operating head 22 is centered in its data track by a servo operating in the track following mode. The intermediate discs 12 and 16 also have read/write data heads that have been omited in FIG. 1 for the sake of brevity. The dedicated head 20 is positioned as shown on the left hand side of the bottom disc 18 which is the dedicated disc. The heads are mounted on and moved by a head/arm stack assembly 28 which is disposed at a slightly tilted angle, to demonstrate one form of information position shift. The heads are not to scale and have less width in relation to track spacing than the actual heads so that head position between the tracks may be readily seen.

As a result of factors such as aging, shock, temperature cycling, or tilt of either the axis of the arm stack, which is shown, or the disc stack, when the present head 22 is centered on a data track all other heads may be offset from their corresponding tracks. The dedicated head 20 may be offset as shown to the left of a corresponding dedicated track center 26 and the target head 24 may be offset to the right of the corresponding data track on the disc 10. Prior to a seek movement, the present head 22, which may be reading or writing data, is centered on the corresponding data track 30 on the data disc 14. Position offset between the dedicated head 20 and the present head 22 is now measured as the magnitude and direction of position offset of the dedicated head 20 with respect to the track center 26 on the dedicated disc 18. This measurement, using dedicated head output, is accomplished while in the servo track following mode on the present head.

This determination of offset between the dedicated head 20 and the track center 26, noted as the initial offset in FIG. 1, is used to determine the desired adjusted or compensated track count during a seek operation. A typical seek movement four tracks to the right of track 26 is shown in FIG. 1. The seek mode of servo operation is initiated by a target address command which includes a track count from a present position to a target position for a particular data head, here called the target head. If the track 26, (the zero count track) is between the dedicated head and the target position, one count is added to the target address. In this seek operation and after determining the adjusted track count corresponding to the initial dedicated head position offset, the head/armstack assembly is moved to the right, as shown in FIG. 1. The target address is counted down. Movement slows as the zero count is approached and the dedicated head stops near the center of the selected track. The track following mode on the dedicated head is now initiated, centering the dedicated head on the selected track. The target head now has an unknown position offset with respect to its track. Once the dedicated head is settled in this position, the track following mode of the servo is again initiated using the target head 24 as input. The unknown position offset of the target head is indicated on the right hand side of the target track of the target disc 10. From this unknown track offset position the head/armstack assembly is moved to the left, moving the target head 24 into its final track centered position, as indicated by the dotted line representation of the target head.

FIGS. 2 through 7 illustrate details of a presently preferred embodiment of this invention. FIG. 2 shows the magnetic characteristics of four phases of inphase and quadrature phase servo codes (dibits) magnetically recorded on the dedicated disc. The servo track centers are designated 0 and 1. The inphase track center is centered between the inphase servo codes and is where the quadrature phase servo code or dibits are written. The quadrature track center is where the inphase and or sampled (data) dibits are written. The four phases are designated A, B, C, and D, along the tracks. Inphase servo codes are recorded on concentric track centers in repeating phase locations along the track centers. Thus inphase servo code recordings are repeated in phase A along track 0 and in phase C along track 1. Phase A inphase servo code recordings will appear in all even numbered tracks and Phase C inphase servo code recordings will appear in all odd numbered tracks. Quadrature phase servo codes are recorded in phases B and D midway between the inphase servo codes, as seen for example on each side of track 1. These also repeat in respective phases B and D, as indicated in the top and bottom quadrature phase recordings in phase D.

Two phases of servo code (dibits) are also recorded in segments along the data tracks of the data discs. These are respectively recorded in adjacent phase spaced relationships on opposite sides of a data track center. These are used in the track following mode for track centering the data heads.

When the dedicated magnetic head is centered directly on the center of a dedicated track (an inphase track center, see FIG. 2), the time varying voltages induced in the dedicated head are indicative of its track centered position. For example, movement of the head 20 over the inphase track center through phases A, B and C produces respective patterns of equal amplitudes of time varying inphase voltages on each side of a larger time varying quadrature phase voltage, see FIG. 2a. Processing of this voltage as by a position discriminator (the track followers in FIG. 6), produces a zero servo voltage. As the dedicated magnetic head moves radially to either side of the track center of FIG. 2, on the spinning disc, the induced head voltage from the differential of the inphase codes, say, A–C, after processing, again as by position discrimination, results in a voltage which is characterized in FIG. 3. This voltage-versus distance on opposite sides of track center has positive and negative voltage portions which are substantially linear between the ¼ track offset points and is useful in that range in determining track position offset. Its nonlinearity beyond that point, however, negates unambiquous track offset determinations.

Figure 4:
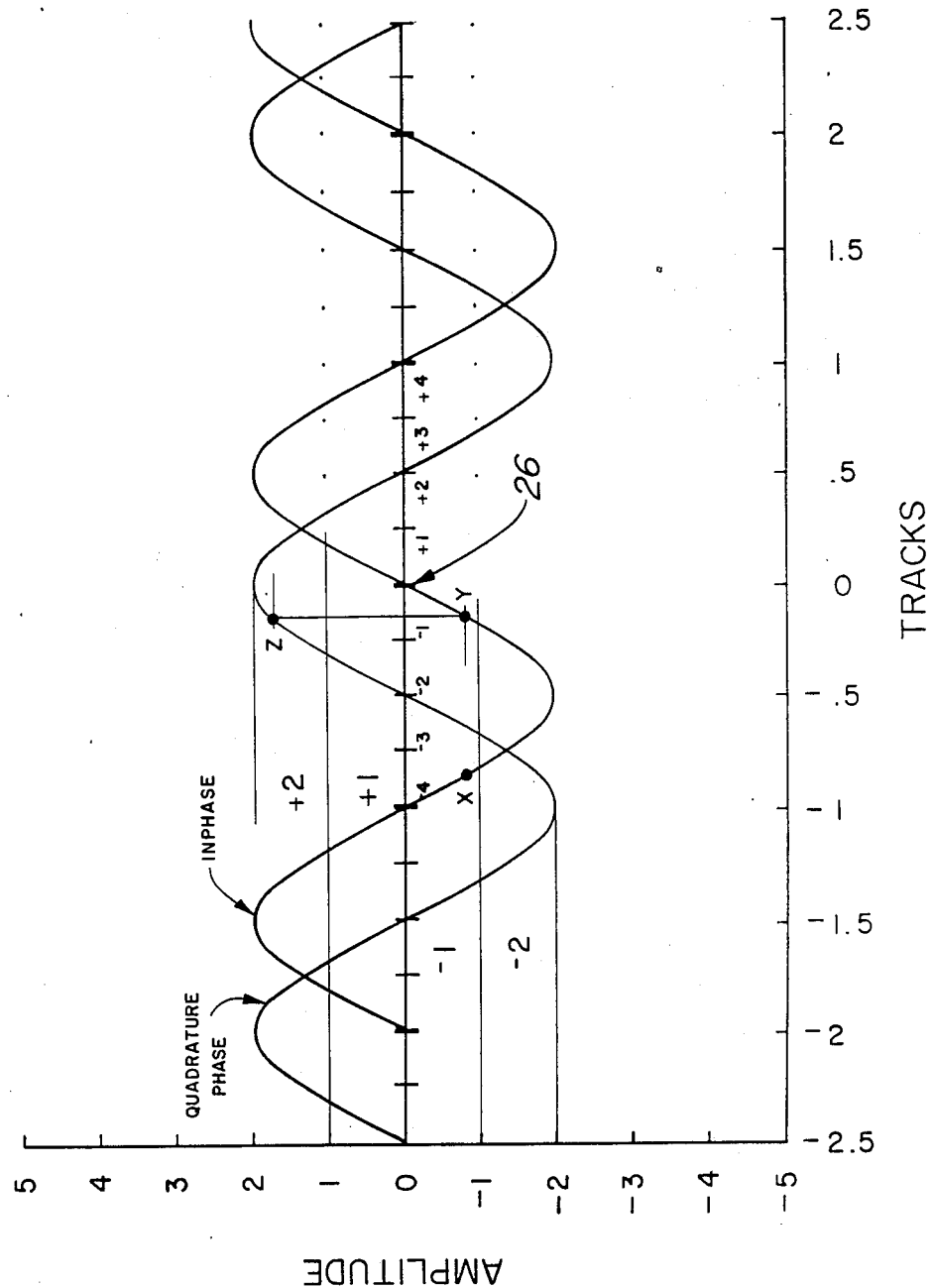
FIG. 4 shows characteristic inphase and quadrature phase dedicated voltages generated as a function of dedicated head offset as the dedicated head moves across adjacent tracks on the spinning disc in FIG. 1.

As the dedicated magnetic head moves radially across adjacent tracks during the seek mode of operation, inphase and quadrature phase voltage waveforms, as indicated in FIG. 4, are generated from the time varying voltages induced in the dedicated head. The substantially full track resolution on either side of a track center, achieved in accordance with the present invention, is explained as follows. Adjacent one-quarter (¼) track divisions or quadrants are arbitrarily assigned numbers weighted +1, +2, +3 and +4 and −1, −2, −3 and −4 with respect to and on the opposite sides of a track center 26, FIGS. 1 and 4. The plus and minus sign values of these numbers +1 through +4 and −1 through −4 on the horizontal axis of FIG. 4, indicate the assigned plus or minus direction of offset of the dedicated magnetic head with respect to a given track center 26. The +1 and +2 and −1 and −2 weighted notation on the vertical axis of the voltage waveforms of FIG. 4, indicate differing assigned positive and negative levels or ranges of voltage of the inphase and quadrature phase servo voltages.

In order to measure the position offset of the dedicated head with respect to a given track center 26 the system must be in the track following mode of operation on the present head, i.e., the present head is track centered. With the dedicated head in the −1 track quadrant, in the illustrated example, FIG. 1, the voltage magnitude of the inphase signal of FIG. 4 is first read. However, the vertical voltage magnitude (−1) at position Y in the (−1) track quadrant cannot be distinquished from a like vertical voltage magnitude (−1) for position X which is in the (−4) track quandrant. In order to resolve this track quandrant ambiguity and determine that the head position is in the (−1) quandrant instead of the −4 quandrant, it becomes necessary to then refer to the quadrature phase signal amplitude at point Z which is (+2) which uniquely confirms the correct dedicated head position offset information of line YZ which is in the (−1) track quandrant with respect to track center 26. Having this YZ information, the correct offset quadrant in which the dedicated head is positioned is identified.

This information is used to adjust the track count, if needed, in a subsequent head seek movement. Thus, if it is desired to move the dedicated head to the right in FIG. 4 and thereby cross the first or zero count track center 26, then this initial track count must be accounted for in using the dedicated head to count the track crossings to the target position, for example, by adding a fifth count to a four (4) track count to a target position. On the other hand, if it desired to move the dedicated head to the left in FIG. 4, then the dedicated head will not cross the zero count track 26. In this case no correction to the track count is required.

The logical interpretation of the in phase and quadrature phase voltage levels in determining position offset is demonstrated in FIG. 5 which maps the assigned quadrature voltage levels versus the assigned inphase voltage levels, identifying the plus and minus track offset quandrants, individually designated by the related pairs of the inphase and quadrature phase signals. The numbers and their signs (+ or −) in each of the 16 boxes shown in FIG. 5, indicate the quadrant of offset in which the dedicated head rests. When the inphase and quadrature phase measurements, respectively, have the (−1) and +2 voltage levels indicated on the horizontal and vertical rows and columns for this map the dedicated head is in the (−1) quadrant of head offset. This dedicated head position is shown in FIGS. 1 and 4. As will be described in more detail below, the digitized information set forth in the map of FIG. 5, when processed with information as to a track count (target address) to a new target position, is used by the servo processor of FIG. 6, to develop or to select a velocity profile and servo current commands for achieving optimum servo performance in driving the dedicated head to the designated target position.

Table I, below, illustrates the way in which the system processes the information derived from the inphase and quadrature phase signals for determining the track offset quadrant. FIG. 5 may be referred to, as well as FIG. 4, since all possible combination are conveniently displayed in FIG. 5. In Table I, the 1's compliment, −MM, of the quantized voltage MM of the quadrature phase voltage level, QM, is added to three (3), 3+(−MM), to obtain the number of the quadrant of track offset. The sign of the inphase voltage level at the dedicated head location is then added to the quadrant number to complete the identification of the quadrant. Referring to Table I, and using the example of FIGS. 1 and 4, the quadrature phase voltage level at the indicated dedicated head offset is +2. The 2's compliment of +2 is −2 which is (−QM). Then 3+(−2)=1. Adding the minus sign of the inphase voltage level results in quadrant, −1. The specific details are evident from Table I.

Quadrature-inphase overlap in FIG. 4 occurs in quadrants designated by quadrature phase measurements +1, −1 in conjunction with inphase measurements +1, −1 and quadrature phase measurements +2, −2 in conjunction with inphase measurements +2, −2. These are dealt with in the servo processor 48 by resolving specific overlaps to indicate a specific quadrant. For example, quadrature −2 and inphase −2, is resolved as offset quadrant −4, see FIG. 5, and quadrature phase +2 and inphase +2 are resolved as quadrant +2. Others are indicated in FIG. 5.

TABLE I

| (1) QM | (2) MS | (3) MM | (4) −MM | (5) 2's Comp | (6) 3 + (−MM) |
|---|---|---|---|---|---|
| +1 | 1 | 0000 | 1111 | −1 | 2 |
| −1 | 0 | 0000 | 0000 | 0 | 3 |
| −2 | 0 | 0001 | 0001 | 1 | 4 |
| +2 | 1 | 0001 | 1110 | −2 | 1 |

The sign of the inphase measurement is then attached to (3+(−MM)) to get the quadrant.

In Table I, the following conventions are adopted.

1. QM is the Quadrature Voltage Measurement (sign+Mag) in terms of assigned Voltage Levels (1) and (2). (1)<¼ track and (2)>¼ track.

2. MS is the digitized sign of QM. (+)=1; (−)=0

3. MM is the digitized or quantized magnitude of QM in which:

$$MM < \begin{matrix} 0 = < \frac{1}{4} \text{ track} \\ 1 = > \frac{1}{4} \text{ track} \end{matrix}$$

4. If MS is (+) then take the 1's Compliment (−MM) of MM Compliment each bit 1→0; 0→1.

5. Re-stating −MM as a 2's Compliment number to get column (5).

6. Develop (3+(−MM) to get column (6) and add the sign of the inphase voltage to get the actual quadrant of offset.

Figure 6:
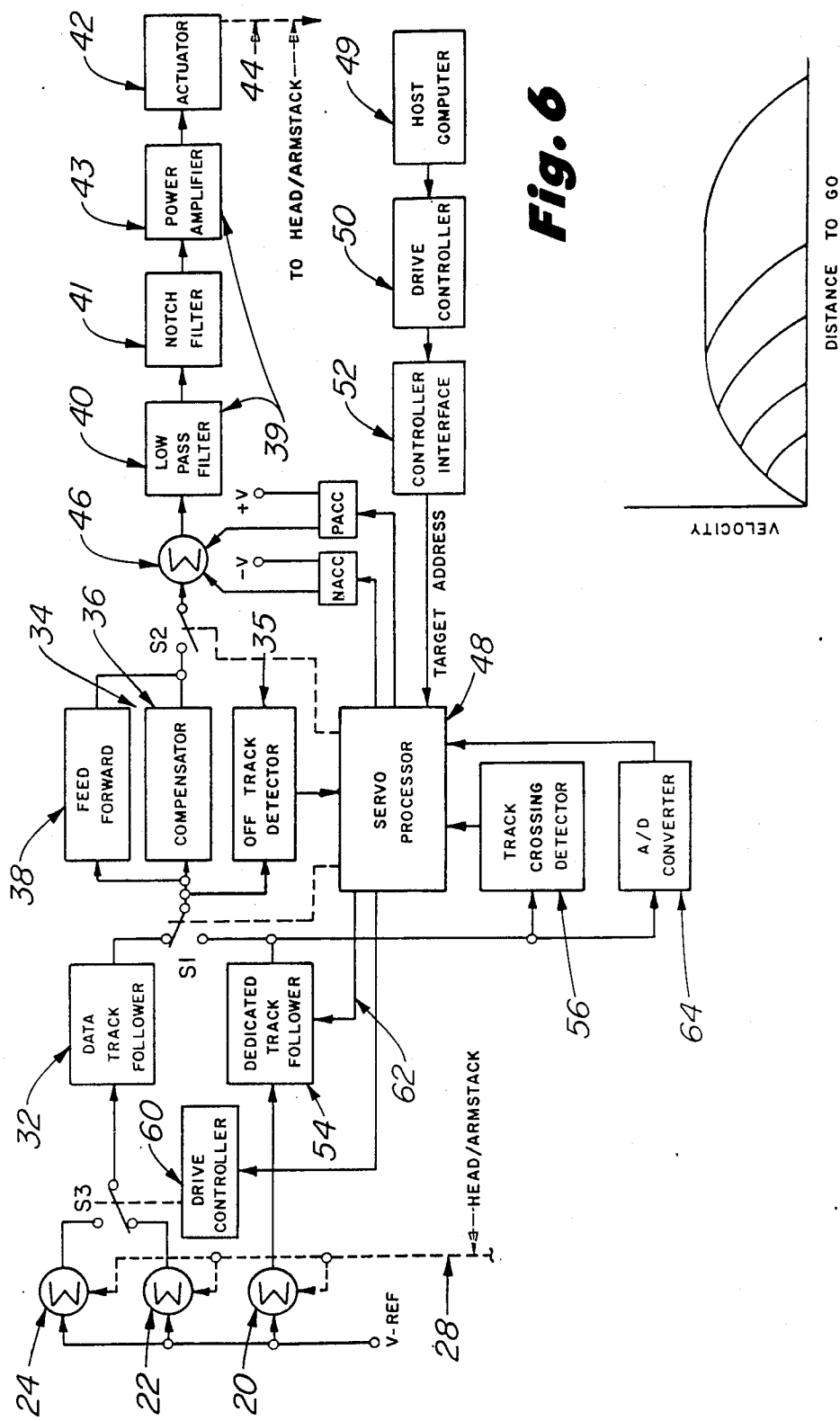
FIG. 6 shows in block diagram form, a system for compensating track/head offset according to a preferred embodiment of the invention.

The servo system which implements this invention is shown in the block diagram of FIG. 6. Two separate control systems sharing common parts are used to control the position of the heads. One is a linear position control system or fine position servo which is used in the track following mode to keep the selected data head at the center of the servo track. This is an analog position loop. The other is a nonlinear position control system which is used during the seek mode to move the heads from one track to another.

The linear position control system of FIG. 6 is used at the end of a seek movement to track center the dedicated head and then the target head and to hold a data head such as the target head in the center of the track when reading or writing data. The linear system comprises a track follower 32, or 54, selectively connected by a switch S1, a position compensation stage 34, including a compensator 36 and a feed forward network 38, a filtering and amplification network 39, comprising a low pass filter 40, a notch filter 41 and a power amplifier 43, receiving output from the position compensation stage 34 via a summing junction 46 when the switch S2 is closed, and an actuator 42. The track follower includes a position discriminator and a phase-lock loop. The actuator 42 may be a magnetic driver having a movable member driving an armstack carriage 44 to which the head/armstack assembly 28 is mounted, which closes the position loop. The input circuit of the data track follower 32 is selectively coupled to the present head 22 or the target head 24 by a switching circuit, here depicted as a switch S3.

In the seek mode, requests by a host computer 49, processed by a drive controller 50 are coupled as distance to go to the servo processor 49 by a controller interface 52. Switch S2 now opens and servo processor controls the seek. Negative or positive acceleration command current via NACC or PACC under the control of the servo processor is used to drive the actuator, in bang-bang control of the seek. The nonlinear position control system is used for longer moves, i.e., across one or more tracks. The move lengths, defined by target addresses (track counts), are always known before a seek movement begins. The servo processor 48 is a model 8051, manufactured by the Intel Corporation of Santa Clara, Calif., although others may be used. There is no velocity transducer. The servo processor is used to control the movement of the actuator 42 based only on track crossing information supplied by the track crossing detector 56. Bang bang servo control is used. The acceleration commanded to the actuator is either on or off.

Table II, below, is useful in understanding the function of the servo processor in its differing functional phases in the track following and seek modes of operation.

TABLE II

| Servo Processor Functions | |
|---|---|
| Inputs | Action |
| Track Following Mode - Present Head | |
| a. Quadrature Phase Voltage and Sign From A/D Converter (Dedicated Head) | a. Present Head 22, previously "Target Head", remains Connected to the Data Track Follower from Previous Target Head Track Centering. |
| b. Inphase Voltage and Sign from A/D Converter (Dedicated Head) | b. Data Track Follower 32 and Compensation Network 34 are Connected to the Filter and Amplifier Network 39 via Switch S2 from Previous Target Head Track Centering. |
| c. Track Crossing Signal Zero | |
| Seek Mode - Dedicated Head | |
| a. Target Address From Drive Controller Initiating The Seek Mode | a. Use Seek Mode to open switch S2 and Disconnect Track Followers From Position Loop. |
| b. Track Crossing Signal from Track Crossing Detector | b. Connect Data Track Follower to Target Head for Future Use at Swith S3. |
| c. A/D Signal from A/D Converter | c. Determine Quadrant of Track Offset at the Dedicated Head per Table I. |
| | d. Compensate Target Address Count from Host Computer for Zero Track Crossing, if Needed. |
| | e. Use Target Address Count to generate Current Command Signal for the Seek Mode and by Actuating NACC or PACC to send the current Command to the Power Amplifier. |
| | f. Select Quadrature or InPhase Signal for Track Crossings, Whichever is Greater, to Initiate Track Count, and, to Perform Track Count on the Quadrature Phase Signal as the Inphase Signal Diminishes |
| | g. Use the Elapsed time Between Track Crossings for determining Velocity of Movement |

TABLE II-continued

Servo Processor Functions

| Inputs | Action |
|---|---|
| | Compared with Velocity Profile for pulse width modulation control of the servo. |
| | h. Use the Count of Track Crossings-to-go to Switch Polarity of the Servo Driving Voltage and Initiate Deceleration, Tracking the Velocity Profile |
| | i. Use Count of Track Crossings To Go to Determine Arrival of dedicated Head at the target Address. |
| Track Following Mode - Dedicated Head After Seek | |
| a. Target Address Reached<br>b. Track Crossing Signal Zero<br>c. A/D Input From Dedicated Head | a. Use Target Address Reached to Operate Switch S1 to Connect Compensator to Dedicated Track Follower and to Close Switch S2 to Close the Linear Position Loop for Track Centering Dedicated Head. |
| Track Following Mode - Target Head After Seek | |
| a. Input from the off track detector 35 indicates the dedicated/sampled head is on track.<br>b. Track Crossing Signal Zero | a. Use of off track detector output to determine when the heads are settled and a read/write operation may be initiated. |

TRACK FOLLOWING MODE—PRESENT HEAD

In this track following mode, the servo processor has operated the switches S1, S2 and S3 to connect the data track follower 32 to the present head 22, previously the target head, and sets up or closes the linear position control system described above, which functions to hold the present head centered on its track. The output of the off-track detector 35, responding to the position offset output of the data track follower, is processed by the servo processor. The servo processor communicates with the drive controller, indicating whether or not the head is the linear position control loop is track centered.

In the track following mode, the track followers produce outputs indicative of the position of the head with respect to track center. The compensator stage 34 responding to the output of the track follower functions as a two stage lead filter compensating network having a desired transfer function with a preselected pole-zero Laplace transformation. The feed forward network 38 is connected in parallel with the compensator 36 in order to decrease the final settling time of the target head on the desired target track. The filter compensation techniques within stage 36 and the feed forward network 38 are well known to those skilled in the art and are therefore not described in circuit detail herein. However, for a further discussion of the circuit details and characteristics of these networks, reference may be made to an article by Ron Palmer in *Control Engineering*, March 1978, entitled "Nonlinear Feedforward Can Reduce Servo Settling Time" at page 53 et seq.

SEEK MODE—DEDICATED HEAD

In the seek mode of operation, the servo processor 48 has the target address from the host computer 49. The compensator stage 34 is disconnected from the servo position loop by the servo processor. The switch S2 is now open. Switch S1 under control of the servo processor, connects the dedicated track follower 54 to the compensator stage 34 in preparation for later track following to track center the dedicated head.

The seek move is intiated by the servo processor after quadrant offset determination. The dedicated track follower 54, responding to the voltages induced in the dedicated head 20 during a track following operation on the present head 22, for example, functions as a position discriminator and produces inphase and quadrature phase voltages indicative of dedicated head offset to the left or to the right of a track center 26. The magnitudes of the voltages and their relationship are a function of track offset. During this track following operation the servo processor 48, via control circuit 62, controls the phase-lock loop of the dedicated track follower to lock on phases B and D, FIG. 4, whereby the quadrature phase voltage is coupled from the dedicated track follower to an A/D converter 64. At this time there are no track crossings to be sensed. The output of the A/D converter is a quantized positive or negative voltage level ($-1$, $-2$, $+1$, $+2$) coupled to the servo processor. The servo processor via control circuit 62, next couples the inphase voltage to the A/D converter from which it receives the quantized positive or negative inphase voltage. Following the logic of Table I, the servo processor now determines the quadrant of offset of the dedicated head.

The target address and the direction of movement received by the servo processor from the drive controller 50 are entered as a track count and a direction of movement from a present track position on any data disc, in a summing junction implemented, for example, as a count down counter (not shown) in the servo processor. The servo processor now comprises part of the nonlinear position control loop described above including the dedicated head 20, the dedicated track follower 54, the track crossing detector 56, the A/D converter 64, the servo processor 48, the filter/amplifier network 39, and the actuator 42 mechanically coupled back, via the armstack carriage 44 and the head/armstack assembly 28, to the dedicated head 20 to close the loop. There are two servo moves in the seek mode of operation. One is the open loop move and the other is the closed loop move. The open loop portion of a seek accelerates the heads to a velocity and position which the closed loop portion can bring within a final velocity window (see FIG. 7).

During the open loop move, the actuator current on and off periods are controlled by the negative acceleration current command or the positive acceleration current command, NACC or PACC, are based on the distance (in tracks) moved. The number of acceleration and coast tracks are based on the original distance to go and the total number of tracks available. Ideally, all that is necessary is to apply full acceleration current during the first half of the distance to go in terms of track counts and command full deceleration current for the rest of the seek for a final velocity of 0 trks/sec. The track or time at which the acceleration current is turned off and the deceleration current applied is called the turn around point. The result of the open loop move is that the heads are positioned at a track based on the original distance to go and are moving within a velocity window such that the closed loop portion can aquire control of the velocity.

The closed loop portion of a seek takes the initial velocity and position attained in the open loop portion and pulls the velocity onto the velocity profile. The final velocity window is a function of how well the closed loop move converges the actual velocity onto the desired profile by the end of the seek.

Velocity feedback is based on a time (1/velocity) feedback loop which follows a predetermined velocity profile versus distance to go. See FIG. 7. The input to the loop is the measured time between track crossings, or, if the distance to go is greater than 20 tracks, between every 5 track crossings. With this information, the previous track crossing time is compared to a table of desired times between track crossings versus distance to go. A deceleration pulse is commanded by the servo processor, closing the feedback loop.

Short seeks (<20 trks) are handled by a different routine which times how long the acceleration is on rather than using distance. This is done since there would be insufficient resolution if track crossings were used because there are so few of them. Indeed, seeks of length less than 8 tracks use separate such routines for each length, again because of the lack of feedback resolution.

The digital counter of the servo processor keeps count of the present distance to the target. The servo processor having the quadrant of dedicated track offset, now compensates the track count to add a count in the counter if the direction of movement to the target position from the present offset position results in crossing the reference track 26, which is the zero count track. The initial count to the target, in terms of the sum of the incremental distances of individual counts, represents a distance to go which is a factor used by the servo porcessor in determining or selecting the velocity profile. The servo processor has a desired velocity profile encoded within a programmable read only memory (not shown).

Figure 7:
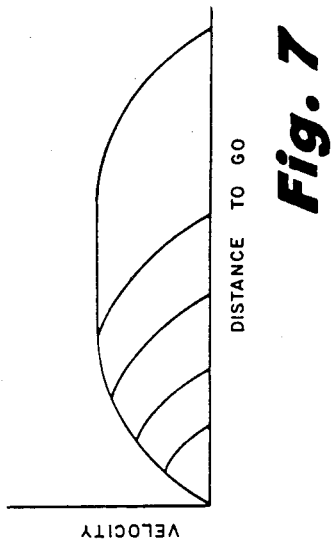
FIG. 7 shows typical velocity profiles used in seek control.

The servo processor initiates seek movement by selecting current command NACC or PACC as seen in Table II. The servo now accelerates open loop as described above. Normally the servo processor via circuit 62 selects the quadrature phase signal from the dedicated track follower 54 to produce the track crossing signals. But if this signal happens to be in a lower or near zero level at that dedicated head offset, for example, near the outer edge of quadrant (−2) or the inner edge of quadrant (−3), the servo processor will initiate operation using the inphase signal at that location, switching to the quadrature phase signal as the inphase signal diminishes. Track counting always takes place under the control of the quadrature phase signal. As seen in FIG. 7, for target addresses approaching a maximum track count, head velocity peaks and remains constant until a predetermined minimum track count is reached. At this point the servo processor switches the command current via NACC and PACC to achieve deceleration. For lesser counts, as seen in FIG. 7, the servo does not reach maximum velocity before deceleration is initiated.

TRACK FOLLOWING—DEDICATED HEAD

At this minimum or zero count in the count down counter, or prior thereto, the servo processor operates the switch S1 to connect the dedicated track follower (position discriminator) 54 to the compensator stage 34. The velocity is now near zero. The servo position loop is now connected to the dedicated position discriminator as part of the linear control system and the dedicated head is track centered on the dedicated target track.

TRACK FOLLOWING—TARGET HEAD

The signals from the track crossing detector are now zero and the output of the offtrack detector 35 indicates ontrack. Using this information, the servo processor actuates the switch S1 to connect the data (sampled) position discriminator or track follower 32 to the compensator 34 of the servo position loop. The servo processor, see Table II, has earlier caused the drive controller 60 to connect the target head 24 as input to the data track follower 32. Track following under the control of the target head 24 is now initiated to track center the target head. The output of the offtrack detector 35 when the head is centered is used as an indication that a read or write operation may be initiated. Should the head shift off track during a reading or writing operation, the offtrack circuit output stops the operation.

INDUSTRIAL APPLICABILITY

These disc drives are used in peripheral equipment for computer or data processing systems.

What is claimed is:

1. In a disc drive having a plurality of memory discs, one memory disc being a data memory disc having concentric data tracks thereon and a data transducer head therefor, each data track including servo information, another memory disc being a dedicated servo disc having concentric dedicated servo information tracks thereon with intermediate dedicated servo information tracks therebetween, and a dedicated transducer head therefor which is mechanically connected to said data transducer head, the method of determining track/head position offset, comprising:
   a. employing time varying servo information voltages produced by said data transducer head to maintain said data transducer head in a substantially centered position with respect to one data track;
   b. employing time varying servo information voltages produced by said dedicated transducer head while said data transducer head is in a substantially centered position with respect to said one data track, to generate two time varying voltages as a function of the offset position of said dedicated transducer head on one side of a dedicated servo track, which dedicated servo track corresponds to said one data track, said time varying voltages being in quadrature phase relationship and each having positive and negative going voltage excursions; and
   c. using at least the sign of one of said two voltages and at least the sign and the magnitude of the other of said two time varying voltages at said offset position to determine the extent of offset of said dedicated transducer head with respect to said dedicated servo track on said one side of said dedicated servo track, approaching but not including one dedicated servo track of position offset.

2. The method according to claim 1, comprising:
   a. producing said one of said two time varying voltages as an inphase voltage from said dedicated servo information tracks; and
   b. producing said other of said two time varying voltages as a quadrature phase voltage from said intermediate dedicated servo information tracks, which is in quadrature phase with said inphase voltage.

3. The method according to claim 2, in which:
   a. the signed voltage magnitudes of said in phase and said quadrature phase voltages at an offset position, with respect to a dedicated servo track approaching but not including one dedicated servo track of position offset, provide the direction and the magnitude of said offset position with respect to said dedicated servo track.

4. The method according to claim 2, in which:
a. the positive and negative voltage portions of said inphase and said quadrature phase voltages are divided into substantially equal parts, defining first and second signed voltage levels including negative first and second voltage levels and positive first and second voltage levels for each of the inphase and quadrature phase voltages and the combination of a signed inphase voltage level with a signed quadrature phase voltage level at a particular track offset location is used to determine the extent of offset with respect to that particular track.

5. The method according to claim 4, comprising:
a. quantizing said first and second signed voltage levels of said inphase and quadrature phase voltages as 1 and 2, respectively;
b. producing a digital signal indicative of the 1's compliment of the signed quantized quadrature phase signal at said particular track offset;
c. utilizing said digital signal to produce a further digital signal $(3+(-QM))$ indicative of the location of said particular track offset in increments of one-quarter of the distance between said particular track and an adjacent track; and
d. attaching the sign of said inphase voltage at that particular track offset location, to said last named digital signal to identify the side of said particular track on which said particular track offset is located.

6. The method of claim 1, comprising:
a. recording four phases of servo code on said dedicated servo disc in a repeating pattern, inphase servo codes being recorded on dedicated tracks in alternate positions along said tracks with quadrature phase servo codes which are recorded between said tracks; and
b. scanning said inphase and quadrature phase servo codes with said dedicated transducer head to generate said two time varying voltages which are in quadrature phase relationship.

7. The method of compensating head/track position offset in a disc drive having respective dedicated, and data heads on corresponding memory discs, comprising:

a. centering a selected data head on a selected data track;
b. determining the position offset of said dedicated head with respect to a dedicated servo track corresponding to said selected data tracks, while said selected data head is centered on said selected data track;
c. providing a track count to a target track to which said dedicated head is to be moved;
d. moving said dedicated and data heads toward said target track, counting track crossings of said dedicated head and stopping movement when no more than one track count remains to said target track; and
e. thereafter centering said dedicated head on said target track.

8. The method of claim 7, comprising:
a. adding a track count to said track count to said target track when said corresponding track lies between said dedicated head and said target track.

9. The method of claim 7, comprising:
a. centering a different data head on its memory disc on a track corresponding to said target track after said dedicated head has been centered on said target track.

10. A disc drive, comprising:
a. a data memory disc having a data head therefor and servo codes recorded in servo track thereon;
b. a dedicated disc having a dedicated head therefor and dedicated servo codes recorded in dedicated servo tracks thereon;
c. means mechanically connecting said data and dedicated heads;
d. means for track centering said data head on one servo track;
e. means responsive to voltages induced in said dedicated head while said data head is track centered for generating first and second time varying voltages which are in quadrature phase relationship and;
f. means responsive to the magnitudes of said time varying voltages at a particular track offset position of said dedicated head with respect to a dedicated track corresponding to said one servo track for determining the track offset position of said dedicated head with respect to said dedicated track.

11. The invention of claim 10, comprising:
a. means for determining the track offset position of said dedicated head in ¼ increments of track spacing.

* * * * *